United States Patent [19]
DeCosta

[11] Patent Number: 5,746,271
[45] Date of Patent: May 5, 1998

[54] CLIMATE CONTROLLED DOGHOUSE

[76] Inventor: Daniel J. DeCosta, 443 W. Church Ave., Longwood, Fla. 32750

[21] Appl. No.: 762,191

[22] Filed: Dec. 9, 1996

[51] Int. Cl.⁶ .................................................. F25D 23/00
[52] U.S. Cl. ........................... 165/53; 62/263; 119/448
[58] Field of Search ...................... 62/262, 263; 165/53; 119/448

[56] References Cited

U.S. PATENT DOCUMENTS

| | | | |
|---|---|---|---|
| 4,119,084 | 10/1978 | Eckels | 126/270 |
| 4,700,887 | 10/1987 | Timmons | 119/448 |
| 5,361,981 | 11/1994 | Albert et al. | 165/53 |

*Primary Examiner*—William E. Tapoical
*Attorney, Agent, or Firm*—Dorothy S. Morse; American Inovations Inc

[57] ABSTRACT

A doghouse having an heating and air conditioning unit installed therein with insulated walls, an insulated roof, hinges connecting the roof on one of its sides to the upright walls for easy access by the pet owner to the controls of the heating and air conditioning unit. The present invention also has a flexible door covering with laterally overlapping parallel strips that are made from a heavy material so as to be minimally affected by tangling and frequent wind interaction. The strips are vertically hung from the upper part of the door opening to allow pets freedom of access in and out of the doghouse, while at the same time retaining the major portion of the climate controlled air within the insulated walls and roof of the doghouse during pet use.

7 Claims, 2 Drawing Sheets

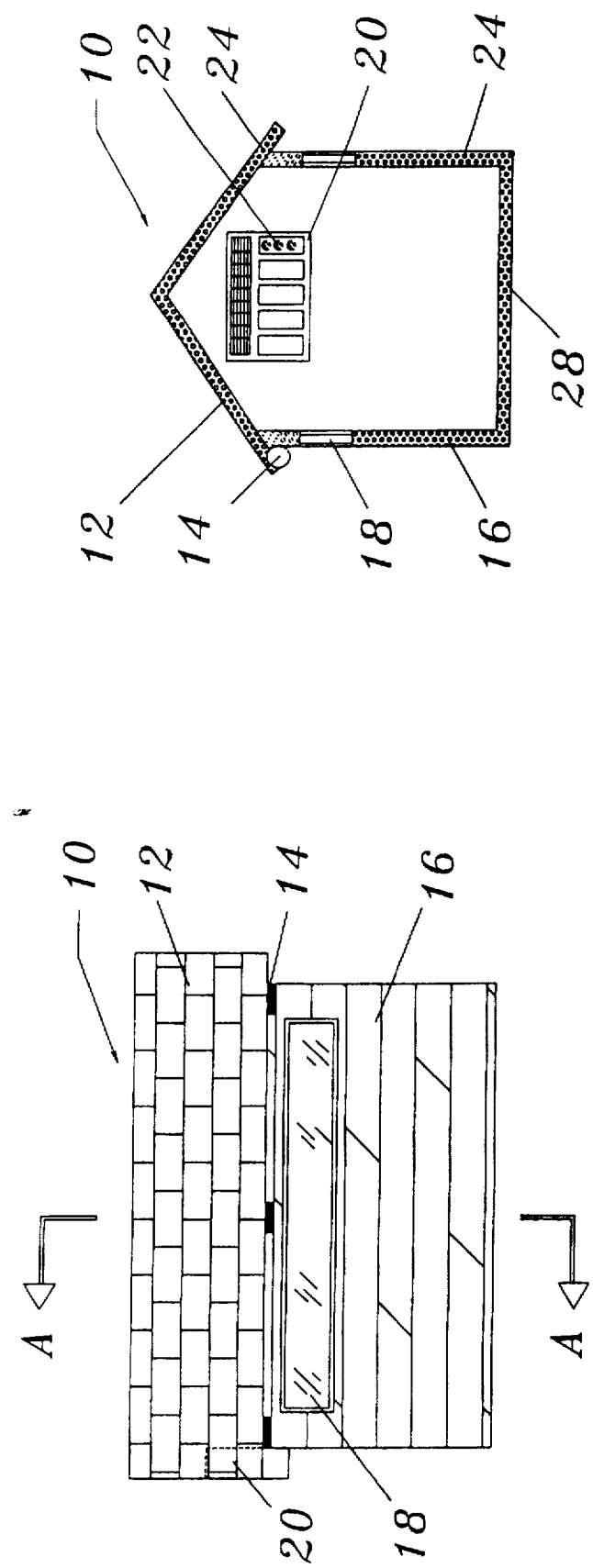

CLIMATE CONTROLLED DOGHOUSE

BACKGROUND—FIELD OF INVENTION

This invention relates to doghouses and pet shelters, specifically to a doghouse having an heating and air conditioning unit installed therein with insulated walls, an insulated roof, hinges connecting the roof to its upright walls for easy access to the controls of the heating and air conditioning unit, as well as a flexible door covering having vertically parallel members made from a heavy material and hung from the upper part of the door opening to allow freedom of access in and out of the doghouse by the animals using it, while retaining the major portion of the climate controlled air within the insulated walls and roof of the doghouse.

BACKGROUND—DESCRIPTION OF PRIOR ART

Many sizes and configurations of doghouses are known. Doghouses have been made as rectangular structures, as well as in the shapes of igloos, castles, and domed structures. Some pet shelters have windows and some do not. However, many pet shelters are unusable in warm weather as the internal temperatures within the pet shelters become too hot for the comfort and well-being of the pet. Also, many pet shelters are unusable in cold weather and when nighttime temperatures become too cold for the comfort and well-being of a pet. Therefore, a climate controlled pet shelter with means of to moderate its internal temperature would be advantageous for extended use of the pet shelter in summer and winter months.

A rectangular-shaped pet shelter having windows is disclosed in U.S. Design Pat. D335,002 to Read (1993), while one with a circular cross-section and windows is disclosed in U.S. Design Pat. D357,769 to Connelly (1995). Also, igloo-shaped pet shelters are disclosed in U.S. Design Pat. D360,709 to Northrop (1995) and U.S. Design Pat. D244,949 to Welker (1977). Even though the upper surfaces of the Northrop and Welker inventions appear to be removable, and the Connelly and Read inventions have windows, none of these inventions is shown to have an insulated roof, insulated walls, and a door closing that is designed to retain climate controlled air within its insulated walls and roof structure.

The prior art thought to be most closely related to the present invention are the inventions disclosed in U.S. Design Pat. D330,274 to Smith (1992), U.S. Design Pat. D328,505 to Perry (1992), and U.S. Design Pat. D335,965 to Spring (1993). The Spring invention shows an enclosed, heated car seat for infants with fans for circulation of warm air and a rotatable cover attached thereto for use in placing the infant into, and removing the infant from, the enclosed spaced over the car seat. The Spring invention is also shown to have an electrical cord attached thereto with an adapter on its distal end for plugging the car seat heater and fan into the cigarette lighter, or electrical power access point, on the dashboard of a motorized vehicle. The present invention is dissimilar to the Spring invention in configuration, and the present invention has a climate control system that cools the doghouse in addition to heating it. The Perry invention discloses a rectangular-shaped doghouse having a door flap. However, the Perry door flap appears to be made form a single sheet of material which would let more climate controlled air escape each time a pet moved around it than does the door covering of the present invention. Therefore, the present invention with its door covering made from strips of heavy material hung vertically parallel to one another and in an overlapping manner within the door opening of the doghouse, its upwardly movable roof, and its climate control system make it distinguishable from the Perry invention. The present invention is also distinguishable from the Smith invention which is shown to be an elongated rectangular container with mesh doors and a flat top that is attached to a supporting bar so that the top can be placed in an opened position for reasons such as additional interior ventilation, easy cleaning of the interior, and easy access to the pets placed inside. It is not known to have a doghouse having an heating and air conditioning unit installed therein with insulated walls, an insulated roof, hinges connecting the roof to the upright walls for easy access to the heating and air conditioning unit, as well as a flexible door covering having vertically II parallel members made from a heavy material and hung from the upper part of the door opening to allow freedom of access in and out of the doghouse by the animals using it, while retaining a major part of the conditioned air within the insulated walls and roof of the doghouse.

SUMMARY OF INVENTION—OBJECTS AND ADVANTAGES

It is the primary object of this invention to provide a doghouse with a climate controlled interior. It is also an object of this invention to provide a doghouse with an insulated floor, roof, and walls to lower the cost of maintaining a moderate temperature within the doghouse interior. A further object of this invention is to provide a doghouse with a hinged roof for easy access by the pet owner to the air conditioning and heating unit controls. It is also an object of this invention to provide a doghouse with an attractive exterior design.

As described herein, properly manufactured and used, the present invention would provide a doghouse having a climate controlled interior for use by pets when ambient temperatures are too hot or cold for the comfort and well being of the pets. The present invention would have insulated walls, an insulated floor, and an insulated roof. The present invention would also have a heating and air conditioning unit installed therein, with hinges connecting the roof to its upright walls for easy access to the controls of the heating and air conditioning unit. In addition, the present invention would have a flexible door covering through which the pet could have access to the climate controlled interior, but which would retain the major portion of the climate controlled air within the insulated walls and roof In the preferred embodiment the door covering would be made from strips of heavy material, hung so as to be vertically parallel to one another and overlapping one another so as to completely cover the door opening. In the preferred embodiment the air conditioner and heating unit would be powered by an electrical cable that is buried so that the pet would not be tempted to chew it. Alternatively, it is also contemplated for the air conditioner and heating unit to be powered by a battery, generator, or an overhead cable connected over the roof of the present invention. Optional features of the present invention would comprise an L.E.D. display on the exterior of the doghouse for monitoring internal temperatures therein without having to open its hinged roof, an L.E.D. display within the interior of the pet owner's house for use by the pet owner in remotely monitoring internal temperatures within the doghouse, remote controls located within the interior of the pet owner's house for use by the pet owner for remotely adjusting the interior temperature of the doghouse, and the positioning of a maximum/minimum thermometer within the interior of the doghouse so that the pet owner can use such information to evaluate the effectiveness of the heating and air conditioning unit.

The description herein provides preferred embodiments of the present invention but should not be construed as limiting the scope of the doghouse invention. For example, variations in the configuration and dimension of the walls and roof, the size of the air conditioning and heating unit installed, the type of hinging means used for the roof, the exterior design, the number of windows used, and the material from which the door covering is made, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 1 is a side view of the invention.

FIG. 1A is a sectional end view of the invention across the line A—A in FIG. 1.

DETAILED DESCRIPTION OF PREFERRED EMBODIMENTS

Figure 3:
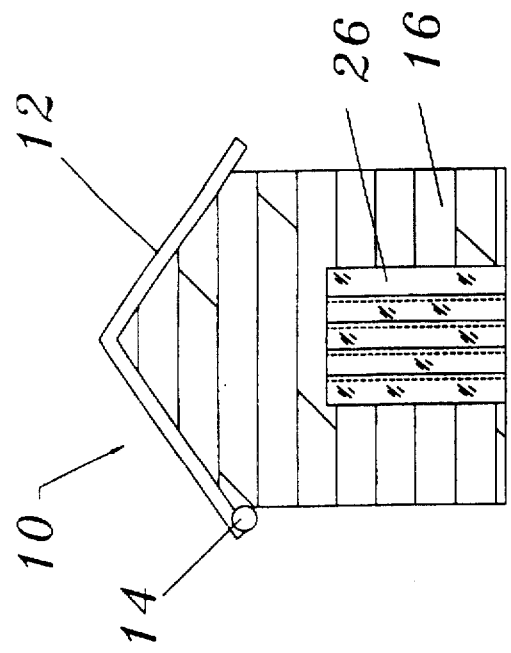
FIG. 3 is a front end view of the invention.

FIG. 1 shows a preferred embodiment of a climate controlled doghouse 10 having a roof 12 supported on top of walls 16. Although walls 16 are formed into a rectangular configuration, such a rectangular shape is not critical to the present invention. FIG. 1 also shows climate controlled doghouse 10 having a horizontally elongated window 18 positioned near the upper surface of wall 16, and a plurality of hinges 14 connected between roof 12 and wall 16. It is contemplated for hinges 14 to be made from plastic so they won't deteriorate upon exposure to humid outdoor air. In addition, FIG. 1 shows air conditioning and heating unit 20 positioned under roof 12 at one end of climate controlled doghouse 10. It is preferred that air conditioning and heating unit 20 be positioned through the upper portion of one wall 16 so as to minimize contact with pets housed within climate controlled doghouse 10. In the preferred embodiment it is contemplated for roof 12, walls 16, and windows 18 to be made from materials that are easily washable, such as plastic materials. Also since it is contemplated for climate controlled doghouse to be used in both summer and winter seasons, it is contemplated for roof 12, walls 16, and windows 18 to be made from materials that are resistant to the deteriorating effects of solar radiation and temperature extremes. Hinges 14 allow roof 12 to be raised on one of its sides for easy access to thermostatic controls, shown in FIG. 1A as number 22, as well as access to the interior of climate controlled doghouse 10 for cleaning purposes.

FIG. 1A shows roof 12 supported on top of walls 16, with hinges 14 positioned between one wall 16 and roof 12. FIG. 1A also shows windows 18 positioned through opposed walls 16 near the upper surface of each wall 16, and air conditioning and heating unit 20 positioned under roof 12 through one end of climate controlled doghouse 10. Although the thermostatic controls 22 for air conditioning and heating unit 20 are could be positioned on the outside of climate controlled doghouse 10, it is preferred that thermostatic controls 22 be positioned within climate controlled doghouse 10 to limit access to them by young children (not shown). Hinges 14, attached between roof 12 and one wall 16, allow ease of access to thermostatic controls 22 by adults (not shown) needing to adjust the temperature within the interior of climate controlled doghouse 10. In addition, FIG. 1A shows roof 12, walls 16, and the floor 28 of climate controlled doghouse 10 being made from insulated materials 24. In the preferred embodiment of the present invention it is contemplated for windows 18 to be made from a shatterproof, transparent material, such as PLEXIGLASS®.

Figure 2:
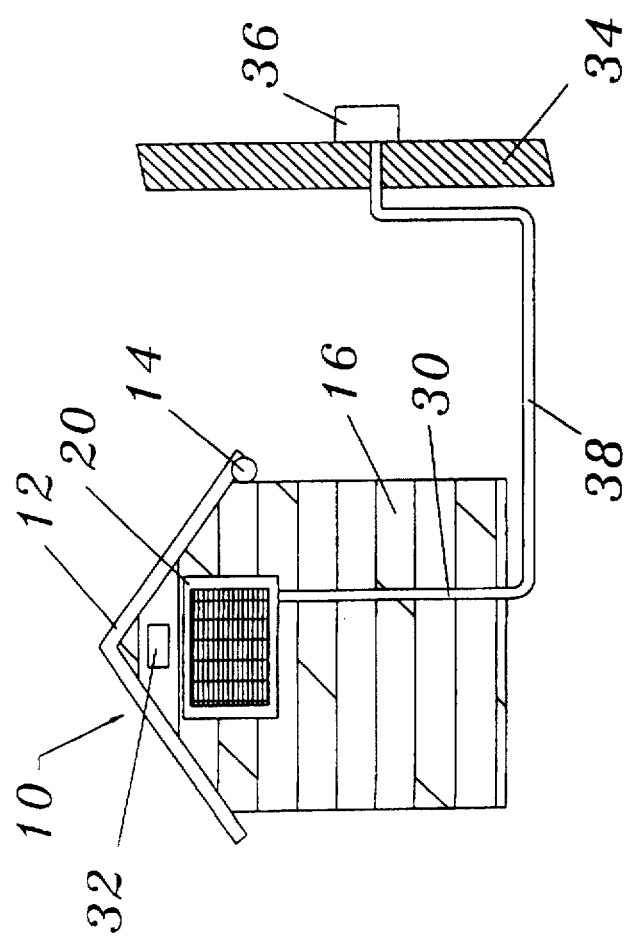
FIG. 2 is a back end view of the invention.

FIG. 2 shows air conditioning and heating unit 20 under roof 12 and positioned through wall 16. FIG. 2 also shows hinge 14 connected between one edge of roof 12 and wall 16 so that the opposed side of roof 12 may be raised for easy cleaning of the interior of climate controlled doghouse 10, as well as easy access to thermostatic controls 22 positioned within the interior of climate controlled doghouse 10. FIG. 2 further shows wall 16 having a design on its outer surface which has the appearance of siding used in residential construction for decorative enhancement of climate controlled doghouse 2 and a power cord 30 for connecting air conditioning and heating unit 20 to a remote power source (not shown). In addition, FIG. 2 shows an L.E.D. display 32 positioned on the exterior of wall 16 above heating and air conditioning unit 20 for monitoring internal temperatures within walls 16 and roof 12 without having to open roof 12. Although FIG. 2 shows L.E.D. display 32 positioned on the exterior of wall 16 above heating and air conditioning unit 20, such positioning is not critical to the present invention and it is contemplated to have any positioning of L.E.D. display 32 which makes it easily read. FIG. 2 also shows a house wall 34 at a spaced distance from wall 16, a control box 36 positioned on the interior side of wall 34, and wiring 38 connected between heating and air conditioning unit 20 and control box 36. Although not shown, in the preferred embodiment it is contemplated for control box 36 to comprise both controls for adjusting the temperature within climate controlled doghouse 10 and an L.E.D. display for remote monitoring of internal temperatures within doghouse 10. Further, although not shown, it is contemplated for a minimum/maximum thermometer to be placed within doghouse 10 to give the pet owner information to evaluate the effectiveness of heating and air conditioning unit 20.

FIG. 3 shows climate controlled doghouse 10 having roof 12 supported on wall 16 with hinge 14 connected between one edge of roof 12 and wall 16. FIG. 3 also shows wall 16 having a design on its outer surface which resembles siding used in residential construction and a door covering 26 made from laterally overlapping strips of material. It is contemplated for door covering 26 to be made from a heavy material so that strips are not easily tangled by movement of large pets through the door opening and so that wind does not easily move door covering 26 to disturb it closure function. It is also contemplated for door covering 26 to be made of transparent material, hung from the upper surface of the door opening in wall 16, and to completely cover the door opening in climate controlled doghouse 10 so as to retain a maximum amount of the climate controlled air (not shown) within insulated roof 12 and walls 16, while pets move through door covering 26, as well as during times when door covering 26 remains undisturbed.

To use the present invention, a pet owner would place climate controlled doghouse 10 on level ground. After securing air conditioning and heating unit 20 through wall 16 in one end of climate controlled doghouse 10, the pet owner would connect it to a remote power source, preferably through use of an underground cable, or an overhead one, so that the pet would not be tempted to play with and chew the cable. In the alternative a generator (not shown) or a battery (not shown) could be used to power air conditioning and heating unit 20. After lifting roof 12 upward from hinges 14 and positioning thermostatic controls 22 on appropriate settings to activate air conditioning and heating unit 20, the pet owner would ensure that door covering 26 completely covered the door opening in climate controlled doghouse 10 so that the major portion of climate controlled air would be retained within insulated roof 12 and walls 16 during pet use.

What is claimed is:

1. A pet shelter which has an interior that is climate controlled for the comfort of pets therein during times of outdoor temperatures extremes, said pet shelter comprising a floor; a plurality of walls each having an upper portion, one of said walls having a door opening therethrough; a roof having opposite sides; said walls upwardly depending from said floor; said roof supported by said walls; said floor, said roof, and said walls being made from insulated materials that are easily washable, said materials also being resistant to solar radiation and exposure to temperature extremes; a plurality of hinges, each of said hinges being connected between one of said opposite sides of said roof and one of said walls so that the other of said opposite sides of said roof is movable between a closed position and opened positions; an air conditioning and heating unit positioned through said upper portion of one of said walls so as to minimize contact between a pet placed within said pet shelter and said air conditioning and heating unit; said pet shelter also comprising a connection means for connecting said air conditioning and heating unit to a remote power source; and a door covering made from a plurality of strips of material having opposed ends, one of said opposed ends being hung from the one of said walls having said door opening and hung in positions to laterally overlap one another so that said strips completely cover the width of said door opening, the other end of each of said strips hanging downwardly so as to completely cover the length of said door opening, said strips each having sufficient weight so as not to become tangled as a result of movement therethrough of pets and not to be frequently disturbed by winds for a maximum retention within said pet shelter of air that has been moderated in temperature by said air conditioning and heating unit.

2. The pet shelter of claim 1 further comprising a rectangular configuration and a plurality of windows, each of said windows being positioned through one of said walls.

3. The pet shelter of claim 1 wherein said air conditioning and heating unit has a plurality of thermostatic controls, and wherein said thermostatic controls are positioned within said roof and walls to minimize interference by young children.

4. The pet shelter of claim 1 wherein said strips are made from transparent material.

5. A pet shelter which has an interior that is climate controlled for the comfort of pets therein during times of outdoor temperatures extremes, said pet shelter comprising a floor; a plurality of walls each having an upper portion, one of said walls having a door opening therethrough; a roof having opposite sides; said walls upwardly depending from said floor; said roof supported by said walls; said floor, said roof, and said walls being made from insulated materials that are easily washable, said materials also being resistant to solar radiation and exposure to temperature extremes; a plurality of hinges, each of said hinges being connected between one of said opposite sides of said roof and one of said walls so that the other of said opposite sides of said roof is movable between a closed position and opened positions; an air conditioning and heating unit positioned through said upper portion of one of said walls so as to minimize contact between a pet placed within said pet shelter and said air conditioning and heating unit; said pet shelter also comprising a connection means for connecting said air conditioning and heating unit to a remote power source; and a door covering made from a plurality of strips of transparent material having opposed ends, one of said opposed ends being hung from the one of said walls having said door opening and hung in positions to laterally overlap one another so that said strips completely cover the width of said door opening, the other end of each of said strips hanging downwardly so as to completely cover the length of said door opening, said strips each having sufficient weight so as not to become tangled as a result of movement therethrough of pets and not to be frequently disturbed by winds for a maximum retention within said pet shelter of air that has been moderated in temperature by said air conditioning and heating unit.

6. The pet shelter of claim 5 further comprising a remote control box connected to said air conditioning and heating unit and a quantity of wiring connecting said remote control box to said air conditioning and heating unit, said remote control box having a temperature display means so that a person can remotely monitor temperatures within said pet shelter and adjust them accordingly.

7. The pet shelter of claim 5 wherein said walls have an outside surface and further comprising a temperature display means positioned on said outside surface of one of said walls so that a person can monitor temperatures within said pet shelter without having to open said roof.

* * * * *